United States Patent
Broman et al.

(10) Patent No.: US 8,124,877 B2
(45) Date of Patent: *Feb. 28, 2012

(54) SEMICONDUCTIVE POLYMER COMPOSITION

(75) Inventors: Claes Broman, Odsmal (SE); Lena Lindbom, Kungalv (SE); Ulf Nilsson, Stenungsund (SE); Annika Smedberg, Myggenas (SE); Alfred Campus, Eysins (CH); Roger Carlsson, Save (SE); Ola Fagrell, Stenungsund (SE); Jan-Ove Bostrom, Odsmal (SE); Anders Gustafsson, Karlskrona (SE); Andreas Farkas, Stenungsund (SE); Peter Carstensen, Nyhamuslage (SE); Anders Ericsson, Baar (CH)

(73) Assignee: Borealis Technology Oy, Porvoo (FI)

( * ) Notice: Subject to any disclaimer, the term of this patent is extended or adjusted under 35 U.S.C. 154(b) by 1184 days.

This patent is subject to a terminal disclaimer.

(21) Appl. No.: 11/574,942

(22) PCT Filed: Sep. 9, 2005

(86) PCT No.: PCT/EP2005/009720
§ 371 (c)(1),
(2), (4) Date: Aug. 16, 2007

(87) PCT Pub. No.: WO2006/027261
PCT Pub. Date: Mar. 16, 2006

(65) Prior Publication Data
US 2008/0050588 A1  Feb. 28, 2008

(30) Foreign Application Priority Data

Sep. 10, 2004  (EP) .................................. 04021606

(51) Int. Cl.
*H01B 7/00*  (2006.01)
(52) U.S. Cl. ..................... 174/110 R; 428/375; 428/372; 428/389; 174/120 R; 524/495; 252/500; 252/511; 525/240
(58) Field of Classification Search ............. 174/110 R, 174/120 R, 102 SC, 106 SC, 110 AR, 102 R, 174/105 R, 106 R, 120 C, 120 SC
See application file for complete search history.

(56) References Cited

U.S. PATENT DOCUMENTS

| | | | |
|---|---|---|---|
| 4,791,160 A | | 12/1988 | Kato et al. |
| 4,897,451 A | * | 1/1990 | Nakagawa et al. ........... 525/192 |
| 5,246,783 A | * | 9/1993 | Spenadel et al. .............. 428/461 |

(Continued)

FOREIGN PATENT DOCUMENTS

CA  2145366  9/1995

(Continued)

*Primary Examiner* — Jill Gray
(74) *Attorney, Agent, or Firm* — Roberts Mlotkowski Safran & Cole, P.C.

(57) ABSTRACT

The invention relates to a semiconductive polymer composition for use in power cables. The composition comprises a multimodal ethylene homo- or copolymer produced in a polymerization process comprising a single site catalyst whereby the polymer composition has a density of 870 to 930 kg/m3, a MFR2 of 1 to 30 g/10 min and a Mw/Mn of less than or equal to 10.

19 Claims, 2 Drawing Sheets

Geometry of the plaque sandwich used for space charge tests (mm).

U.S. PATENT DOCUMENTS

| | | | |
|---|---|---|---|
| 5,556,697 | A | 9/1996 | Flenniken |
| 5,718,974 | A * | 2/1998 | Kmiec .......................... 428/383 |
| 5,731,082 | A * | 3/1998 | Gross et al. .................. 428/379 |
| 5,852,116 | A * | 12/1998 | Cree et al. ...................... 525/72 |
| 6,329,054 | B1 * | 12/2001 | Rogestedt et al. ............ 428/378 |
| 6,369,129 | B1 | 4/2002 | Martensson et al. |
| 6,433,095 | B1 * | 8/2002 | Laurent ......................... 525/240 |
| 6,441,096 | B1 * | 8/2002 | Backman et al. ............. 525/240 |
| 6,545,093 | B1 * | 4/2003 | de Lange et al. ............. 525/191 |
| 6,797,886 | B1 * | 9/2004 | Gustafsson et al. ...... 174/110 R |
| 7,155,092 | B2 * | 12/2006 | Martinsson ................... 385/100 |
| 7,416,686 | B2 * | 8/2008 | Aarila et al. .................. 252/500 |
| 7,625,982 | B2 * | 12/2009 | Martin et al. ................. 525/240 |
| 7,732,711 | B2 * | 6/2010 | Ericsson et al. ......... 174/110 R |
| 2004/0213527 | A1 * | 10/2004 | Martinsson ................... 385/100 |
| 2008/0033107 | A1 * | 2/2008 | Wouters et al. ................ 525/53 |
| 2008/0050588 | A1 * | 2/2008 | Broman et al. ............... 428/375 |
| 2008/0190645 | A1 * | 8/2008 | Ericsson et al. ........ 174/120 SC |
| 2008/0262136 | A1 * | 10/2008 | Akermark et al. ............ 524/330 |
| 2009/0020749 | A1 * | 1/2009 | Jager et al. ....................... 257/40 |
| 2010/0282492 | A1 * | 11/2010 | Machl et al. .............. 174/113 R |

FOREIGN PATENT DOCUMENTS

| | | | |
|---|---|---|---|
| EP | 0517868 | | 12/1992 |
| EP | 0644558 | | 3/1995 |
| EP | 0688794 | | 12/1995 |
| EP | 0949274 | | 10/1999 |
| EP | 0962944 | | 12/1999 |
| EP | 1065672 | | 1/2001 |
| EP | 1267189 | * | 12/2002 |
| EP | 1634913 | * | 3/2009 |
| JP | 2000-319464 A | | 11/2000 |
| WO | 9212182 | | 7/1992 |
| WO | 9512622 | | 5/1995 |
| WO | 9618662 | | 6/1996 |
| WO | 9964509 | | 12/1999 |
| WO | 0034341 | | 6/2000 |
| WO | WO 01/03147 | * | 1/2001 |

* cited by examiner

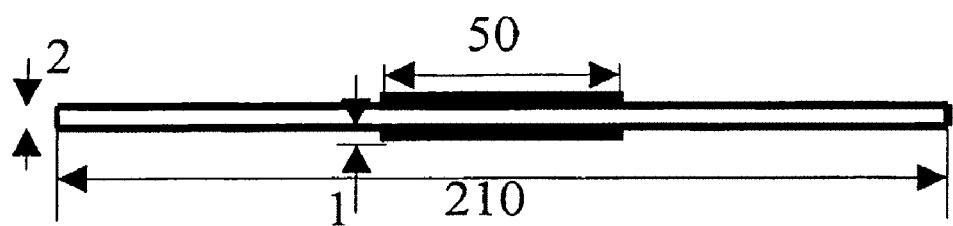
Figure 1. Geometry of the plaque sandwich used for space charge tests (mm).

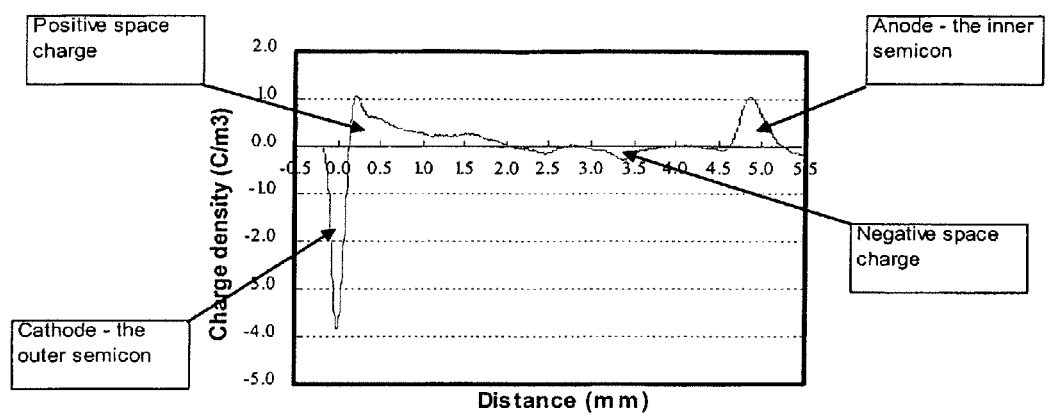
Figure 2: Space charge distribution in a power cable with insulation thickness 5,0 mm. The cable was subjected to 100 kV DC for 12 hours at ambient temperature before the PEA measurements. The shown distance is the distance from the outer semiconductive layer (the grounded electrode).

SEMICONDUCTIVE POLYMER COMPOSITION

BACKGROUND

The invention relates to a semiconductive polymer composition, preferably a carbon black semiconductive polymer composition, for use in power cables, with improved electrical performance and processability compared to other available semiconductive polymer compositions. This invention relates also to a process for producing the polymer as well as the use of the polymer composition as a semiconductive layer of an electric AC-cable or DC-cable.

Generally, in power cables the metallic conductor is covered with an inner polymeric semiconductive layer, a polymeric insulation layer, an outer polymeric semiconductive layer, a metallic shield and finally a polymeric jacket.

A wide variety of polymeric materials have been utilized as electrical insulating and semiconductive shield materials for cables in numerous applications. In order to be utilized in services or products, where a long-term performance is required, such polymeric materials, in addition to having suitable dielectric properties, must also be enduring and must substantially retain their initial properties for safe performance over many years of service. A semiconductive polymer composition must fulfil a number of properties, of which the electrical properties are most vital.

It is known that the space charge performance of cables can be influenced by the selection of the components in the semiconductive material. Space charge is an accumulation of electrical charges (electrons, holes and ions) inside the insulation leading to electrical field distortion. They emanate from components inside the insulation or from injection of electrons from the semiconductive layers. Space charges trapped in high voltage insulation systems (i.e. polymeric power cables) can significantly alter the internal electrical field distribution, possibly leading to premature failure of the system at stresses well below anticipated or design values.

Efforts have been made to improve semiconductive polymer compositions, especially to reduce the space charge effects by maintaining other important properties, for example surface smoothness and good processability. Thereby semiconductive polymer compositions have been used which include an ethylene-acrylate copolymer, carbon black, stabiliser and organic peroxide crosslinking agent.

In the following some concepts shall be defined:

The melt flow rate (MFR) is measured in g/10 min. of the polymer discharged through a defined die under specified temperature and pressure conditions and is a measure of the viscosity of the polymer which in turn for each type of polymer is mainly influenced by its molecular weight, but also by its degree of branching. The melt flow rate measured under a load of 2.16 kg (ISO 1133) is denoted as $MFR_2$. In turn, the melt flow rate measured with 21.6 kg is denoted as $MFR_{21}$.

As a further characteristic, the molecular weight distribution (MWD) which is the relation between the number of molecules in a polymer and the molecular weight of the individual molecules has to be considered. The width of the distribution is given as a number defined as the ratio (Mw/Mn) between the "weight average molecular weight" $M_w$ divided by the "number average molecular weight" $M_n$.

EP 1 065 672 A2 (UNION CARBIDE CHEM PLASTIC) discloses a composition comprising an olefin polymer, such as a copolymer of ethylene and unsaturated esters with an ester content of at least about 5% per weight based on the weight of the copolymer, and carbon black of about 25% to about 45% per weight based on the weight of the composition, with strictly defined properties, such as particle size of at least about 29 nm and a tint strength of less than about 100%. However, the application gives no information how the space charge properties can be influenced.

EP 0 644 558 A1 (Alcatel Cable) describes an insulative structure for cables, comprising at least one first semiconducting layer that is contiguous and coaxial with the core of the cable and is surrounded by a second electrically insulating layer which is itself covered by a third semiconducting layer, characterised in that the said semiconducting layers are exclusively composed of a matrix, comprising non-polar polymers whose components have a molecular weight (molar mass) greater than 1000.

CA 2145366 (BICC Cables Corp) discloses a semiconductive shield compositions containing a linear, single-site catalysed polymer formed by polymerising ethylene with at least one comonomer selected from $C_3$ to $C_{20}$ alpha-olefins; a carbon black selected from furnace carbon blacks that contain ash and sulphur in amounts of 50 ppm or less and have crystal dimensions $L_a$ and $L_c$ of 30 A or less, acetylene carbon blacks, and furnace carbon blacks having an ASTM grad of N-351; and a crosslinking agent. The ethylene copolymer has a narrow molecular weight distribution due to the single-site catalyst and is therefore not multimodal.

U.S. Pat. No. 5,246,783 (Exxon Chemical Patents, Inc.) describes a semiconductive composition comprising ethylene copolymer having a density of 0.86 g/cm³ to 0.96 g/cm³ and a molecular weight distribution Mw/Mn of 1.5 to 30. However, the disclosure does not use a multimodal ethylene copolymer.

It is known that polymers produced by a single-site catalyst have a narrow molecular weight distribution (MWD) which is detrimental to known extrusion processes. For good extrudability, however, a broad molecular weight distribution is required.

Therefore, the problem which has to be solved is to provide a semiconductive polymer composition with both improved space charge performance and good processability leading to long lifetime of the cables.

SUMMARY OF THE INVENTION

According to the present invention there is provided a semiconductive polymer composition comprising multimodal ethylene homo- or copolymer produced in a polymerization process comprising a single-site catalyst;
wherein the polymer composition has a density of 870 to 930 kg/m², a $MFR_2$ of 1 to 30 g/10 min. and a Mw/Mn of less than or equal to 10
which leads to a polymer composition with excellent properties, especially good space charge properties and good processability.

The density and the melt flow rate (MFR) are mainly affected by the type of polymer, but also by further additives. Hence, the given ranges of density, $MFR_2$ and the ratio of Mw/Mn are understood according to this invention, as values of the semiconductive polymer composition measured without additives, especially without carbon black additives.

BRIEF DESCRIPTION OF THE DRAWINGS

FIG. 1 illustrates the geometry of press-molded plaques used for conducting the space charge accumulation evaluations according to the present application; and FIG. 2 presents a graph demonstrating the space charge distribution in a power cable.

DETAILED DESCRIPTION OF THE INVENTION

The semiconductive polymer composition of the invention combines the benefits of the properties achieved by the single-site catalyst used in a polymerization process and by keeping the above-mentioned ranges of the density, the $MFR_2$ and the ratio of Mw/Mn.

The composition can be obtained by blending or by an in-situ-process as described below. However, it is preferred that the composition is obtained by an in-situ-process, more preferred by an in-situ-process as described below.

To achieve a polymer with a broad molecular weight distribution, i.e. a multimodal ethylene homo- or copolymer, a polymerisation process using single-site catalysts is required.

The expression "modality of a polymer" refers to the form of its molecular weight distribution (MWD) curve, i.e. the appearance of the graph of the polymer weight fraction as a function of its molecular weight. If the polymers produced in a sequential step process, e.g. by utilizing reactors coupled in series and using different conditions in each reactor the different polymer fraction produced in the different reactors will each have their own molecular weight distribution which may considerably differ from one another. The molecular weight distribution curve of the resulting final polymer can be looked as the superposition of the molecular weight distribution curves of the polymer fractions which will, accordingly, show two or more distinct maxima or at least distinctly broadened compared to the curves for the individual fractions. A polymer showing such a polymer weight distribution curve is called bimodal or multimodal, respectively. Bimodal and multimodal polymers can be produced according to several processes e.g. as those described in WO 92/12182.

However, alternatively, the bimodal or multimodal polymer may be produced through polymerisation in a single reactor with the aid of a dual site coordination catalyst or a blend of different coordination catalysts. The dual site catalyst may comprise two or more different single-site species each of which produces a narrow molecular weight distribution and a narrow comonomer distribution.

The inventive semiconductive polymer composition proves compared to unimodal material the better processability in terms of lower pressure during extrusion and longer time for scorch formation as demonstrated in the Brabender test (test method described below).

The multimodal ethylene homo- or copolymer is preferably produced in a multi-stage process in a multi-step reaction sequence such as described in WO 92/12182 (Borstar process). The contents of this document are included herein by reference.

In this process, in a first step ethylene is polymerized in a loop reactor in the liquid phase of an inert low boiling hydrocarbon medium. Then, the reaction mixture after polymerization is discharged from the loop reactor and at least a substantial part of the inert hydrocarbon is separated from the polymer. The polymer is then transferred to a second or further step to one or more gas phase reactors, where the polymerization is continued in the presence of a gaseous ethylene. The multimodal polymer produced according to this process has a superior homogeneity with respect to the distribution of the different polymer fractions which cannot be obtained, e.g. by a polymer mix.

The catalyst as above stated of the production of the polymer for the semiconductive polymer composition comprises a single-site catalyst, such as e.g. a metallocene catalyst. Preferred single-site catalysts are described in EP 688794, EP 949274, WO 95/12622 and WO 00/34341. The contents of these documents are included herein by reference. However, the single-site catalyst is not limited to the catalyst as referred above.

The benefit of using a single-site catalyst in a multimodal process as described above is to achieve a peroxide crosslinkable semiconductive polymer making it possible to achieve sufficient crosslinking degree of the final product without formation of "scorch" during the extrusion. In processing such polymer compositions by extrusion, it is important that crosslinking does not occur until the mixture has left the extruder, since premature crosslinking or scorch makes it impossible to maintain a uniform production capacity, and furthermore the quality of the resulting product will be unsatisfactory. Crosslinking or precuring within the extruder causes gelation and adhesion of the polymer gel to surfaces of the equipment, with consequent risk of plugging. The extruder, therefore, has to be cleaned to remove adhering polymer gel and for every cleaning operation the equipment must be shut down, which entails a loss in production.

Furthermore, any gel lumps which do not clogg the production equipment can be incorporated into the product in the form of unwanted agglomerates. These defects might have major negative impact on the electrical performance of the cable.

It is well known that the use of a single-site catalyst provides an uniform distribution of comonomer in the polymer chain. However, the single-site catalyst in a multimodal process additionally comprises the advantage of a broader molecular weight distribution which leads to a better extrudability.

In order to minimize the risk for scorch formation due to peroxide decomposition it is preferred that the inventive composition is extrudable at a temperature of less than 120° C., more preferred of less than 110° C., most preferred of less than 100° C.

The molecular weight of the multimodal ethylene homo- or copolymer can be characterized by the way of its melt flow rate (MFR) according to ISO 1133 at 190° C. The melt flow rate is mainly depending on the average molecular weight. This is because long molecules give the material a lower flow tendency than short molecules.

An increase in molecular weight means a decrease in the MFR-value. It is required that the $MFR_2$ of the polymer composition is in the range of 1 to 30 g/10 min., preferably of 2 to 25 g/10 min., and most preferred of 3 to 20 g/10 min.

As a further characteristic, the molecular weight distribution (MWD) which is the relation between the number of molecules in a polymer and the molecular weight of the individual molecules has to be considered. The width of the distribution given as a number defined as the ratio (Mw/Mn) between the "weight average molecular weight" $M_w$ divided by the "number average molecular weight" $M_n$ has to be less than or equal to 10, preferred less than or equal to 8, more preferred less than or equal to 7, and most preferred less than or equal to 6. However, it is additionally preferred that the composition has a Mw/Mn ratio of greater than or equal to 2.0, more preferred 2.5, still more preferred 3.0 and most preferred 3.5.

It is especially preferred that the Mw/Mn ratio ranges from 2.5 to 10, more preferably from 3 to 8 and most preferably from 3.5 to 6.

For the determination of the Mw/Mn ratio, the Size Exclusion Chromatography (SEC) or Gel Permeation Chromatography (GPC), which is essentially a process for separation of molecules according to their size, or more accurate, the hydrodynamic radius of the molecules in the solution, can be used. The precise method used is given in the example section.

As a further requirement, the density of the polymer composition has to be in a given range. The density has influence on the properties of the semiconductive polymer composition such as mechanical strength and shrinkage characteristics. Additionally, the optimum dispersion of possible additives is dependent on the right choice of the density. For this reason, a balance between these properties has to be established. For the inventive polymer composition the density has to range between 870 to 930 kg/m$^3$, preferably 880 to 915 kg/m$^3$, more preferably 885 to 915 kg/m$^3$.

Preferably not only the semiconductive polymer composition fulfils the above stated requirements of MFR$_2$, Mw/Mn ratio and density, but also the multimodal ethylene homo- or copolymer produced in a polymersation process comprising a single-side catalyst.

It is preferred that the multimodal ethylene homo- or copolymer is non-polar as this leads to further improved space charge performance as for example shown in examples C vs B. A non-polar homo or copolymer according to this invention is a polymer which has no permanent electric dipole moment originating from the monomers. Therefore, it is preferred that the polymer does not comprise polar groups, more preferred only consists of C and H and still more preferred the polymer is an saturated polymer consisting of C and H, only.

The multimodal ethylene homo- or copolymer comprises preferably a low molecular weight (LMW) ethylene homo- or copolymer fraction and a high molecular weight (HMW) ethylene homo- or copolymer fraction. Thereby, the LMW fraction has a lower molecular weight than the HMW fraction. Depending on whether the multimodal ethylene homo- or copolymer is bimodal or has a higher modality, the LMW and/or HMW fraction may comprise only one fraction each or two or more subfractions.

The expression "ethylene homopolymer" as used herein refers to a polyethylene that consists substantially, i.e. of at least 97% by weight, preferably at least 99% by weight, and more preferably at least 99.5% by weight, and most preferably at least 99.8% by weight of ethylene.

Preferably, the multimodal ethylene homo- or copolymer is a bimodal polymer, more preferably a multimodal ethylene homo- or copolymer is a bimodal polymer consisting of one LMW fraction and one HMW fraction.

It is further preferred that the copolymer comprises at least one $C_3$-$C_8$ alpha-olefin as a comonomer, preferably at least one comonomer is selected from the group consisting of propylene, 1-butene, 4-methyl-1-pentene, 1-hexene and 1-octene. Preferably, the amount of comonomers in the ethylene polymer is 0.02 to 5.0 mol %, more preferably 0.05 to 2.0 mol %.

Further, it is preferred that the multimodal ethylene homo- or copolymer is produced according to the below-described process. Preferably, the LMW fraction is produced in a loop reactor and the HMW fraction in a gas phase reactor.

A drawback with semiconductive materials based on non-polar polymers instead of EBA, EVA and other polar polymers is reduced adhesion between the inner semiconductive layer and the metal conductor leading to higher shrinkback and thereby possibly problems during cable installation. For this reason it is preferred that the polymer composition comprises additionally a low level of polar additives or a polar copolymer. A polar copolymer is a compound which contains a polar covalent bond having a permanent electric dipole moment. Therefore, it is preferred that the copolymer comprises additionally elements others than C and H, still more preferred the copolymer comprises at least one element selected from the group consisting of O, S, P, Si and N. Yet more preferred the polymer comprises at least one element as defined above and/or at least one unsaturated bond. However, the addition of polar copolymers in the composition will have a negative impact on the space charge performance showed by increased field enhancement factor (FEF) as defined in the description of the used test methods. It is, therefore, preferred that the polar copolymer is present in the total composition up to 10 wt %, more preferred up to 8 wt %, still more preferred up to 6 wt % and most preferred up to 5 wt % (corresponding to 0.7 wt % polar comonomer in semiconductive composition of example F—table I). The small amount of polar copolymers in the semiconductive polymer composition has only a minor effect to the space charges, but a high bonus effect in respect of better adhesion, and processability.

It is further preferred that the polar component is a high pressure copolymer. It is further preferred that the high pressure copolymer contains not more than 30 wt %, more preferably not more than 25 wt %, and most preferred not more than 20 wt % of polar comonomers. Furthermore, it is preferred that the high pressure copolymer, contains 5 to 30 wt %, more preferred 10 to 25 wt %, and most preferred 10 to 20 wt % of polar comonomer.

The high pressure polymer according to this invention, is produced by radical polymerisation at pressures exceeding 1500 bar.

The high pressure polymer is preferably selected from the group consisting of ethylene-butyl-acrylate copolymer, ethylene-ethyl-acrylate copolymer, ethylene-methyl-acrylate copolymer, ethylene-vinyl-acetate copolymer or alternatively an ethylene-vinyl-silane copolymer.

Among vinyl-silane copolymer, VISICO™ (vinyl-silane copolymer), which is a copolymer produced by the tubular high pressure process like in WO 90/07542, is preferred. This document is included herewith by reference. It is basically a polyethylene backbone with randomly distributed silane branches. A preferred vinyl-silane copolymer has a density of 923 kg/m$^3$ and a MFR$_2$ of 0.9 g/10 min. When the high pressure ethylene-vinyl-silane copolymer is used as a polar copolymer additive, the polymer is preferably selected from the group consisting of 1 to 3 wt % ethylene-vinyl-silane copolymer, most preferably 2 wt % ethylene-vinyl-silane copolymer, that is to say a copolymer containing 98 wt % ethylene and 2 wt % vinyl-silane.

It is further preferred that the semiconductive polymer composition comprises conductive additives. It is especially preferred that the conductive component is carbon black.

The dispersion of conductive additive, preferably carbon black, in the component is a critical requirement. A poor carbon black dispersion or presence of foreign particles can cause negative impact on electrical properties. Hence, it is critical that proper dispersion of conductive additives, preferably clean carbon black, is achieved during compounding to ensure good electrical performance.

Therefore, it is preferred to use carbon blacks containing ash in an amount of 100 ppm or less, and sulphur in an amount of 100 ppm or less. More preferably acetylene carbon black is used, because it gives not only a better surface smoothness, but also better space charge properties compared to furnace black.

The choice of carbon black amount is important since space charge properties and processability are improved with decreasing carbon black content. However, the electrical conductivity requirements set a limit. Therefore, the amount of carbon black is preferably less than or equal to 40 wt % of the total polymer, more preferably less than or equal to 35 wt % of the total polymer and most preferably less or equal to 30 wt % of the total polymer. More preferably the amount of carbon black ranges between 10 to 35 wt %, still more preferably 15 to 35 wt %.

Furthermore, it is preferred that the composition is at least partially crosslinked. Preferably a crosslinking agent is present during the extrusion.

Crosslinking agents, such as organic peroxides, are generally suitable. Particularly favourite peroxides include bis-(tert-butylperoxy-isopropyl)-benzene, dicumyl-peroxide and 2,5-dimethyl-2,5-di(tert-butylperoxy)-hexane.

Various other known coagents may be used. Mixtures of antioxidants, scorch retardants and processing aids conventionally used in cable materials may be employed to prepare the final semiconductive polymer composition. It may include polymerized 1,2-dihydro-2,2,4-trimethylquinoline or octadecyl-3,5-di-terz-butyl-4-hydroxy-hydrocinamat in amounts of preferably 0.1 to 2.5 wt %, more preferably 0.4 to 0.8 wt %, as preferred antioxidants. Other suitable conventional antioxidants include sterically hindered phenols, phosphates and selected amines.

Although processing aids are not necessary to achieve a homogeneous semiconductive polymer composition, scorch retardants, polysiloxanes, polyethylene glycols (molecular weight from 10,000 to 30,000) and possibly other additives (preferably free from ionic species) may be incorporated into the semiconductive polymer composition to further improve the properties. Processing aids, when present, are preferably used in amounts of 0.2 to 4.0 wt % based on the total weight of the semiconductive polymer composition.

The invention comprises also the process for producing the semiconductive composition, in particular the process for producing the multimodal ethylene homo- or copolymer in the semiconductive polymer composition.

The multimodal ethylene homo- or copolymer can be produced by blending but is preferred that the multimodal ethylene homo- or copolymer is produced in a multi-stage process like those disclosed in EP-B-0 517 868 and WO-A-96/18662.

Preferably, a first fraction, more preferably a low molecular weight copolymer fraction, is produced in one stage of a multi-stage polymerization process and a second fraction, preferably a high molecular weight copolymer fraction, preferably in another stage of the process. It is preferred that the second fraction, more preferably the high molecular weight fraction, is produced in the presence of a single-site catalyst. More preferably, the first fraction, still more preferably the low molecular weight copolymer fraction, is produced in a continuously operating loop reactor, where ethylene is polymerized in the presence of a polymerization catalyst as stated above and a chain transfer agent such as hydrogen. The diluent is an inert aliphatic hydrocarbon, preferably isobutane or propane. $C_3$-$C_8$ alpha-olefin comonomer(s) is preferably added to control the density of low molecular weight polymer fraction.

Preferably, the hydrogen concentration is selected so that the low molecular weight copolymer fraction has the desired melt flow rate. More preferably, the molar ratio of hydrogen to ethylene is between 0.1 and 1.0 mol/mol, most preferably between 0.2 and 0.8 mol/mol.

In the case the target density of the low molecular weight copolymer fraction exceeds 955 kg/m$^3$, it is advantageous to operate loop reactor using propane diluent in so-called supercritical conditions, where the operating temperature exceeds the critical temperature of the reaction mixture and the operating pressure exceeds the critical pressure of the reaction mixture. A preferred range of temperature is then from 90 to 110° C. and the range of pressure is from 50 to 80 bar.

The slurry is intermittently or continuously removed from the loop reactor and transferred to a separation unit, where hydrocarbons including not reacted $C_3$-$C_8$ alpha-olefin comonomer(s) and especially the chain transfer agent are separated from the polymer. The polymer containing the active catalyst is introduced into the gas phase reactor, where the polymerization proceeds in the presence of additional silane and/or functional $C_3$-$C_8$ alpha-olefin comonomer(s) and optionally chain transfer agent to produce the high molecular weight copolymer fraction. The polymer is intermittently or continuously withdrawn from the gas phase reactor and the remaining hydrocarbons are separated from the polymer. The polymer is collected from the gas phase reactor and is at least a bimodal ethylene homo- or copolymer.

Conditions in the gas phase reactor are selected in a way that the ethylene homo- or copolymer has the desired properties. Preferably, the temperature in the reactor is between 70 and 110° C. and the pressure is between 10 to 40 bar. The hydrogen to ethylene molar ratio ranges from preferably 0.0001 to 0.02 mol/mol, more preferably 0.001 to 0.1 mol/mol, and the alpha-olefin comonomer to ethylene molar ratio ranges preferably from 0.03 to 0.7 mol/mol, more preferably from 0.04 to 0.6 mol/mol, and most preferably from 0.05 to 0.5 mol/mol.

After polymerization it is further preferred that the multimodal ethylene homo- or copolymer is mixed with the conductive additives, preferably carbon black, and possibly high-pressure polar polymers in the amounts as stated above.

When producing this semiconductive polymer composition, the ingredients thereof, such as a multimodal ethylene homo- or copolymer, carbon black, high-pressure polymers and optionally additives should be mixed intimately in order to obtain a composition as homogeneous as possible.

The invention comprises also the use of a semiconductive polymer composition as described above as semiconductive layers of an electric AC-cable or of an electric DC-cable. The invention comprises also an insulated electric AC-cable or DC-cable comprising a conductor, an insulating layer and semiconductive layers comprising the inventive semiconductive polymer composition, preferably consisting of the inventive semiconductive polymer composition. Still more preferred the insulted electric DC-cable or AC-cable comprises a conductor, an inner semiconductive layer, an insulating layer and an outer semiconductive layer whereby at least one of the two semiconductive layers comprises a semiconductive polymer composition as described above. Moreover, it is preferred that the insulating layer of the AC-cable or DC-cable comprises, preferably is, a multimodal ethylene polymer produced in a multi-stage polymerisation process comprising a single-site catalyst.

In the following, the present invention will be further illustrated by means of examples.

Test Methods

| Gel Permeation Chromatography | |
|---|---|
| Equipment | Waters 150CVplus no. 1114 |
| Columns | 3 × Styragel HT6E and for the 2:nd analysis set: 2 × HMW6E + 1 × HMW 7 styragel from Waters (140° C.) |
| Detector | Refractive index (RI) + viscometer. |
| Solvent | 1,2,4-trichlorobenzene(TCB) with antioxidant. |
| Inst. temperature | 140° C. |
| Flow rate | 1.0 ml/min |
| Concentration | 0.6-0.9 mg/ml |
| Antioxidant | BHT (0.25 g/l) |
| Dissolution temperature | 4 h at 140° C. |
| Inj. volume | 500 μl |
| RI-sensitivity | 64 |
| Calibration | Narrow MWD PS (a1114_092002), and for the 2:nd analysis set: Narrow MWD PS (a1116_012003). |

-continued

Gel Permeation Chromatography

Mark-Houwink's for PE K = 3.92 × 10−4 and a = 0.725
Mark-Houwink's for PS K = 9.54 × 10−5 and a = 0.725
Software/Calculation Millennium Volume Resistivity The volume resistivity of the semiconductive materials is measured on crosslinked polyethylene cables with according to ISO 3915 (1981). The construction of the cables is 50 mm stranded Al-conductor and 5.5 mm thick insulation. The inner and outer semiconductive layers have a thickness of 0.9 and 0.8 mm, respectively. The cable line is a 1+2 system, thus one extrusion head for the inner semicon (semicon is used as an abbreviation for a semiconductive layer in a cable), and another for the insulation+outer semicon. Specimens of length 13.5 cm are conditioned at 1 atm and 60±2° C. for 5±0.5 hours before measurement. The resistance of the outer semicon is measured using a four-terminal system using metal wires pressed against the semiconductive layer. To measure the resistance of the inner semicon is it necessary to cut the cable in two halves, removing the metallic conductor. The resistance between conductive silver paste applied on the specimen ends are then used to determine the volume resistivity of the inner semicon.

Space Charge Accumulation

The space charge measurements were performed mainly with pressmoulded plaques with semiconductive electrodes on both sides. The insulating part had a thickness of 2 mm and a diameter of 210 mm. The corresponding dimensions for the semiconductive electrodes were 1 mm and 50 mm. The plates were produced in a two-step process. First the insulation was pressmoulded from an extruded tape at 130° C. for 10 min. The (pre-pressed) semiconductive electrodes were then pressed against the insulation in a second operation carried out at 180° C. for 15 min to ensure crosslinking (if peroxide is present). Cooling to room temperature was done under pressure at a cooling rate of about 20° C./min. Mylar® film have been used as backing during the moulding. The data in this document refer to non-degassed specimens (see FIG. 1).

Additionally, power cables of the same construction are those used for volume resistivity measurements have also been used as specimens for space charge measurements.

The space charge profiles after DC voltage application were determined by a pulse electroacoustic system (PEA). +2.5 kV (+3.5 kV for cables) 50 ns long pulses were used to excite pressure waves that were detected by a 52 mm thick piezo-electric PVDF film on the outer semicon. The signals were recorded at a rate of 0.25 GSamples/s and averaged 256 times in a digital oscilloscope. The charge distribution, i.e. the space charge density vs distance, can then be calculated. The parameter known as the Field Enhancement Factor (FEF) is here used to describe the effect of the space charge on the electric field distribution The FEF is equal to the ratio of the actual electric field strength at the ground electrode and the field strength at the same position assuming no space charges. For example, if FEF is 1.52, then the electric field at the ground electrode has increased with 52% due to presence of space charge inside the insulation.

The normal procedure for plaque tests is to subject the specimen to a high voltage DC voltage of +40 kV for three hours at 50° C., perform a measurement, then turn off the +40 kV source, short-circuit the specimen and then perform an additional measurement. The first measurement is called a "voltage-on" test, the second test is a "voltage-off" test. Here, mainly voltage-on profiles are included. For cables the parameters are different: the applied voltage of the 5.5 mm cables is 100 kV DC.

FIG. 2 shows an example of a voltage-on profile where the signal voltage data have been re-calculated to give the field enhancement factor at the cathode. The leftmost sharp negative peak (at 0 mm) represents the negative charge on the cathode, i.e. the outer semicon, while the positive peak at 5.0 mm represents the charges on the anode, i.e. the inner semicon. These peaks are present even if there is no space charge inside the insulation. The charges between these two peaks are the charges inside the insulation, the space charges. A flat horizontal profile between the electrode peaks means no space charges, but in this case positive charges are observed close to the outer semicon to the left. These are the charges causing the field enhancement. Thus, the target is a flat horizontal line between the electrode peaks, meaning no space charges. In this case, FEF is close to 1.00.

Scorch (Brabender Method)

The resistance to scorch (pre-crosslinking) at normal cable extrusion temperature is determined by the use of a Brabender kneader. The kneader is heated to 125° and a plot of the kneader torque vs time is obtained. In the beginning the torque will decrease due to melting of the material, but then it will increased due to crosslinking. The residence time is the time from the minimum to the time when the torque has increased with 1 Nm compared to the minimum value.

Pressure of Inner Semicon During Cable Extrusion

The pressure of the molten semiconductive composition before the screen pack in the extruder during production of cables with the construction described above in connection with volume resistivity.

Shrinkback

The shrinkback properties of the cables (same construction as those used for volume resistivity measurements) are measured according to AEIC CS5-94, specifying thermal cycling of cable specimen between ambient temperature and 50° C. (2 hours at each temperature). The reported value is the shrinkage after one cycle only.

TABLE I

| | | | | | | | | G |
| | | | | | | | | Single- |
| | | | | B | | | | site |
| | | | A | Commerical | C | D | E | F | Bimodal |
| | | | Commerical | EBA-based | Single- | Single- | Single- | Single-site | resin |
| | | | EBA-based | semicon with | site | site | site | bimodal | from |
| | | | semicon with | acetylene | unimodal | bimodal | bimodal | resin + polar | Borstar |
| | | Unit | furnace black | black | resin | resin | resin | copolymer | process |
|---|---|---|---|---|---|---|---|---|---|
| What's new from column to the left? | | | | Furnace → acetylene black | EBA → Single-site | Unimodal → bimodal | Reduced CB content | Polar copolymer | Borstar process |
| EBA | | w % | 60.2 | 63.35 | | | | 5.00 | 5.00 |

TABLE I-continued

Examples.

| | Unit | A Commerical EBA-based semicon with furnace black | B Commerical EBA-based semicon with acetylene black | C Single-site unimodal resin | D Single-site bimodal resin | E Single-site bimodal resin | F Single-site bimodal resin + polar copolymer | G Single-site Bimodal resin from Borstar process |
|---|---|---|---|---|---|---|---|---|
| Polymer 1 | w % | | | 64.35 | | | | |
| Polymer 2 | w % | | | | 25.6 | 26.60 | 24.54 | |
| Polymer 3 | w % | | | | 37.75 | 39.75 | 36.81 | |
| Polymer 4 | w % | | | | | | | 68.35 |
| TMQ antioxidant | w % | 0.80 | 0.65 | 0.65 | 0.65 | 0.89 | 1.03 | 0.65 |
| Furnace black | w % | 39.0 | | | | | | |
| Acetylene black | w % | | 36.0 | 34.4 | 35.3 | 33.0 | 33.0 | 26.0 |
| Bis(tert.butylperoxy isopropyl)benzene | w % | +1.00 | +1.00 | +1.00 | +1.00 | +0.90 | +0.90 | +1.00 |
| Volume resistivity - Inner semicon | Ω-cm | 125 | 2290 | | | 1830 | 1810 | 6865 |
| Volume resistivity - Outer semicon | Ω-cm | 33 | 67 | | | 312 | 167 | 762 |
| Space charge performance (FEF) Plaques | — | 2.11 | 1.78 | 0.93 | 1.01 | | 1.07 | 1.04 |
| Space charge performance (FEF) Cables | — | | | | | 1.77 | 1.63 | |
| Scorch - Brabender Residence time (min) | Min | | | 160 | 264 | | | |
| Pressure of inner semicon during cable extrusion | bar | | 185 | 180 | 165 | | | 180 |
| Shrinkback (adhesion) | mm | | | | | 1.54 | 0.60 | 0.73 |
| Mn (GPC) | g/mol | | | | 27000 | 27000 | 26000 | 22000 |
| Mw (GPC) | g/mol | | | | 69000 | 69000 | 69000 | 92600 |
| Mw/Mn | | | | | 2.6 | 2.6 | 2.7 | 4.3 |
| Density | kg/m³ | | | 902 | 894 | 895 | 892 | 913 |
| MFR2 | g/10 min | | | 10 | 7.9 | 8.2 | 8.3 | 2.6 |

TABLE II

Details about the single-site polymers used in the examples.

| Grade | Polymer-type | Modality | Density (kg/m³) | Melt flow rate MFR$_2$ (g/10 min) |
|---|---|---|---|---|
| Polymer 1 | Nonpolar Polymer | Unimodal | 902 | 10 |
| Polymer 2 | Nonpolar ethylene-octene copolymer | Unimodal | 897 | 1.6 |
| Polymer 3 | Nonpolar ethylene-octene copolymer | Unimodal | 885 | 30.0 |
| Polymer 4 | Nonpolar ethylene-buten-copolymer (Borstar technology) | Bimodal | 912 | 2.6 |

Example A and B demonstrate that improved space charge properties are obtained with acetylene black compared to furnace black. A comparison between examples B and C shows that the replacement of the polar EBA base resin with a non-polar single site resin improve space charge properties as evidenced from the reduction of FEF from 1.23 to 0.93. By introducing a second single-site resin with other molecular weight distribution (example D), the processing properties are improved as shown by an increase of the Brabender residence time (measure of the scorch performance) from 160 to 264 minutes and by a reduction of the pressure in the extruder. Further improved processing properties can be achieved by reducing the amount of carbon black (example E). The shrinkback properties are improved by adding 5% of a polar copolymer (example F) without any noticeable negative effect on the space charge behaviour. Example G shows that possibility to use a bimodal resin from the Borstar process.

The invention claimed is:

1. A semiconductive polymer composition comprising:
   a multimodal ethylene homo- or copolymer, produced in a polymerisation process comprising a single site catalyst; and
   10 to 40 wt % acetylene black based on the total composition;
   wherein the polymer composition has a density of 870 to 930 kg/m³, a MFR$_2$ of 1 to 30 g/10 min and a Mw/Mn of 2.5 to 10, and wherein the ranges given are measured without additives.

2. A polymer composition according to claim 1, wherein the composition has a Mw/Mn of greater than or equal to 3.0.

3. A polymer composition according to claim 1, wherein the multimodal ethylene homo- or copolymer is a bimodal ethylene homo- or copolymer.

4. A polymer composition according to claim 1, wherein the copolymer comprises at least one C$_3$-C$_8$ alpha-olefin.

5. A polymer composition according to claim 1, wherein the acetylene black is present in an amount of less than or equal to 35 wt % of the total composition.

6. A polymer composition according to claim 1, wherein the acetylene black is present in an amount of 10 to 35 wt % of the total composition.

7. A polymer composition according to claim 1, wherein the composition is partially cross-linked.

8. A polymer composition according to claim 1, wherein the polymer composition is extrudable at a temperature of less than 120° C.

9. The polymer composition according to claim 1, wherein the composition further comprises up to 10 wt % polar copolymer.

10. A polymer composition according to claim 9, wherein the polar copolymer is a high pressure copolymer.

11. A polymer composition according to claim 10, wherein the high pressure copolymer is selected from the group consisting of ethylene-butyl-acrylate, ethylene-ethyl-acrylate, ethylene-methyl-acrylate, and ethylene-vinyl-acetate.

12. A polymer according to claim 9, wherein the polar copolymer contains 5-30 wt % of polar comonomers.

13. A polymer composition according to claim 9, wherein the copolymer is a vinyl-silane-copolymer.

14. An insulated electric DC-cable comprising a conductor, an inner semiconductive layer, an insulating layer and an outer semiconductive layer whereby at least one of the two semiconductive layers comprises a composition according to claim 1.

15. An insulated electric cable according to claim 14, wherein the insulating layer comprises a multimodal ethylene polymer produced in a process comprising a single site catalyst.

16. An insulated electric AC-cable comprising a conductor, an inner semiconductive layer, an insulating layer and an outer semiconductive layer whereby at least one of the two semiconductive layers comprises a composition according to claim 1.

17. An insulated electric cable according to claim 16, wherein the insulating layer comprises the multimodal ethylene polymer produced in a process comprising a single site catalyst.

18. A process for producing a polymer in accordance with claim 1, wherein in a first stage a first fraction is produced, and in a second stage a second fraction is produced in the presence of a single site catalyst.

19. A process according to claim 18, wherein in the first stage a loop reactor is used, and in the second stage a gas phase reactor is used.

* * * * *